(12) United States Patent
Carrillo et al.

(10) Patent No.: US 7,595,367 B2
(45) Date of Patent: Sep. 29, 2009

(54) POLY(ARYLENE ETHER) PREPARATION METHOD

(75) Inventors: Alvaro Carrillo, Delmar, NY (US); Hua Guo, Selkirk, NY (US); Alexey Kruglov, Glenmont, NY (US); Edward Norman Peters, Lenox, MA (US)

(73) Assignee: Sabic Innovative Plastics IP B.V. (NL)

( * ) Notice: Subject to any disclaimer, the term of this patent is extended or adjusted under 35 U.S.C. 154(b) by 0 days.

(21) Appl. No.: 11/845,823

(22) Filed: Aug. 28, 2007

(65) Prior Publication Data

US 2009/0062478 A1    Mar. 5, 2009

(51) Int. Cl.
*C08F 283/08*    (2006.01)

(52) U.S. Cl. .................. 525/391; 528/486; 528/489; 528/499; 528/501

(58) Field of Classification Search .................. 525/391
See application file for complete search history.

(56) References Cited

U.S. PATENT DOCUMENTS

| | | | |
|---|---|---|---|
| 3,496,236 A | 2/1970 | Cooper et al. | |
| 4,562,243 A | 12/1985 | Percec | |
| 4,577,010 A * | 3/1986 | Bottazzini et al. | 528/487 |
| 4,634,742 A | 1/1987 | Percec | |
| 4,663,402 A | 5/1987 | Percec et al. | |
| 4,665,137 A | 5/1987 | Percec | |
| 5,880,221 A | 3/1999 | Liska et al. | |
| 6,211,327 B1 | 4/2001 | Braat et al. | |
| 6,284,850 B1 | 9/2001 | Percec | |
| 6,300,461 B1 | 10/2001 | Braat et al. | |
| 6,303,748 B2 | 10/2001 | Braat et al. | |
| 6,307,010 B1 | 10/2001 | Braat et al. | |
| 6,384,176 B1 | 5/2002 | Braat et al. | |
| 6,429,277 B1 | 8/2002 | Braat et al. | |
| 6,437,085 B1 | 8/2002 | Braat et al. | |
| 6,455,663 B1 | 9/2002 | Braat et al. | |
| 6,469,124 B2 | 10/2002 | Braat et al. | |
| 6,627,704 B2 | 9/2003 | Yeager et al. | |
| 6,860,966 B2 | 3/2005 | Parrillo et al. | |
| 6,897,282 B2 | 5/2005 | Freshour et al. | |
| 6,924,350 B2 | 8/2005 | Dong et al. | |
| 6,962,965 B2 | 11/2005 | Yeager | |
| 7,148,296 B2 * | 12/2006 | Zarnoch et al. | 525/534 |
| 2004/0102583 A1 | 5/2004 | Freshour et al. | |
| 2005/0075462 A1 * | 4/2005 | Zarnoch et al. | 525/391 |
| 2006/0287439 A1 * | 12/2006 | Zarnoch et al. | 525/392 |

FOREIGN PATENT DOCUMENTS

| WO | 01/40354 A | 6/2001 |
|---|---|---|
| WO | 2005/035625 A | 4/2005 |

OTHER PUBLICATIONS

United States Statutory Invention Registration No. H521, Thermosetting Polysulfones, Fan, et al. published Sep. 6, 1988, 35 pages.
U.S. Appl. No. 11/696,539, filed Apr. 4, 2007; Method of Separating a Poly(Arylene Ether) Composition From a Solvent, and Poly(Arylene Ether) Composition Prepared Thereby.
International Searching Authority, International Search Report, PCT/US2008/072959, Date of mailing: Oct. 13, 2008, 6 pages.
International Searching Authority, Written Opinion, PCT/US2008/072959, Date of mailing: Oct. 13, 2008, 6 pages.

* cited by examiner

*Primary Examiner*—Randy Gulakowski
*Assistant Examiner*—Mike Dollinger
(74) *Attorney, Agent, or Firm*—Cantor Colburn LLP

(57) ABSTRACT

Capped poly(arylene ether)s are prepared by a method that includes reacting a poly(arylene ether) with a capping agent to form a capping reaction mixture, washing the capping reaction mixture with a concentrated basic aqueous solution, and isolating the capped poly(arylene ether) by a total isolation method. The washing method is effective for removal of capping-related impurities, and surprisingly does not result in decomposition of the capped poly(arylene ether).

31 Claims, No Drawings

POLY(ARYLENE ETHER) PREPARATION METHOD

BACKGROUND OF THE INVENTION

Poly(arylene ether) is a type of plastic known for its excellent water resistance, dimensional stability, and inherent flame retardancy. Properties such as strength, stiffness, chemical resistance, and heat resistance can be tailored by blending it with various other plastics in order to meet the requirements of a wide variety of consumer products, including plumbing fixtures, electrical boxes, automotive parts, and coated wire. Poly(arylene ether)s are also used as additives to thermoset resins, which are materials that cure to form very hard plastics. The addition of a poly(arylene ether) can make a cured thermoset resin much less brittle.

For some uses and particularly for use in thermoset compositions, the poly(arylene ether) can be modified by "capping" the terminal hydroxy groups with a polymerizable group such as a methacrylate ester. The capping reactions are associated with reagents, catalysts, and byproducts that can contaminate the resulting capped poly(arylene ether) and detract from the dielectric properties of a thermoset composition into which the capped poly(arylene ether) is incorporated. Some methods for separating capping-related contaminants are known, but they have substantial drawbacks. As described in U.S. Pat. No. 6,897,282 to Freshour et al., precipitating the capped poly(arylene ether) from an antisolvent reduces the level of capping related contaminants relative to a total isolation procedure. However, the capped poly(arylene ether) yields from precipitation are sometimes poor, particularly for low intrinsic viscosity capped poly(arylene ether)s. Furthermore, the precipitation process creates antisolvent handling and disposal problems and also produces a capped poly(arylene ether) with poor solid particle characteristics. The Freshour patent also discloses a method of "washing" (extracting) a capping reaction mixture with water prior to total isolation by devolatilizing extrusion. However, that method requires large volumes of the water wash solution (at least a 1:1 volume/volume ratio of water wash to poly(arylene ether) solution), and the method was ultimately ineffective in that residual levels of impurities in the isolated capped poly(arylene ether) were high (for example, methacrylic acid levels of 2,668 to 25,003 ppm were observed in the isolated capped poly(arylene ether)). Also, the present inventors have observed that the laboratory scale methods in the Freshour patent were difficult to scale to a commercial process. Accordingly, there remains a need for improved methods of isolating capped poly(arylene ether)s. In particular, there is a need for a process that produces a high yield of the capped poly(arylene ether) and substantially reduces the concentrations of capping-related impurities.

BRIEF DESCRIPTION OF THE INVENTION

The above-described and other drawbacks are alleviated by a method of preparing a capped poly(arylene ether), comprising: reacting a poly(arylene ether) with a capping agent in the presence of a solvent and a capping catalyst to form a capping reaction mixture comprising a capped poly(arylene ether), solvent, capping agent, capping catalyst, and a capping byproduct; washing the capping reaction mixture with a basic aqueous solution comprising at least 5 weight percent of a base to yield a purified solution comprising capped poly(arylene ether) and solvent; and isolating the capped poly(arylene ether) by a total isolation method.

Another embodiment is a method of preparing a capped poly(arylene ether), comprising: reacting a poly(arylene ether) with a capping agent in the presence of a solvent and a capping catalyst to form a capping reaction mixture comprising a capped poly(arylene ether), solvent, capping agent, capping catalyst, and a capping byproduct; wherein the poly (arylene ether) is the product of oxidatively polymerizing monomers comprising 2,6-xylenol and 2,2-bis(3,5-dimethyl-4-hydroxyphenyl)propane; wherein the capping agent is (meth)acrylic anhydride; wherein the molar ratio of (meth) acrylic anhydride to hydroxy groups on the poly(arylene ether) is 1 to 3; wherein the solvent is toluene; wherein the capping catalyst is 4-(N,N-dimethylamino)pyridine; and wherein the capping byproduct is (meth)acrylic acid; adjusting the concentration of the capped poly(arylene ether) in the capping reaction mixture to 5 to 25 weight percent prior to the washing with the basic aqueous solution; washing the capping reaction mixture with a basic aqueous solution comprising 5 to 15 weight percent of sodium hydroxide to yield a first purified solution comprising capped poly(arylene ether) and solvent; wherein washing the capping reaction mixture with a basic aqueous solution is conducted at a temperature of 60 to 95° C.; washing the first purified solution with an acidic aqueous solution comprising 0.2 to 1 mole per liter acetic acid to yield a second purified solution comprising capped poly (arylene ether) and solvent; wherein washing the first purified solution with an acidic aqueous solution is conducted at a temperature of 60 to 95° C.; washing the second purified solution with water to yield a third purified solution comprising capped poly(arylene ether) and solvent; wherein washing the second purified solution with water is conducted at a temperature of 60 to 95° C.; and isolating the capped poly (arylene ether) by devolatilizing extrusion.

Another embodiment is a (meth)acrylate-capped poly (arylene ether) prepared by the method of the preceding paragraph and comprising less than or equal to 2,500 parts per million by weight of (meth)acryloyl groups as (meth)acrylic acid or (meth)acryloyl anhydride, and less than or equal to 1,000 parts per million by weight of 4-(N,N-dimethylamino) pyridine.

These and other embodiments are described in detail below.

DETAILED DESCRIPTION OF THE INVENTION

The present inventors have discovered that a high yield of capped poly(arylene ether) with low levels of capping-related impurities is produced by a method of preparing a capped poly(arylene ether), comprising: reacting a poly(arylene ether) with a capping agent in the presence of a solvent and a capping catalyst to form a capping reaction mixture comprising a capped poly(arylene ether), solvent, capping agent, capping catalyst, and a capping byproduct; washing the capping reaction mixture with a basic aqueous solution comprising at least 5 weight percent of a base to yield a purified solution comprising capped poly(arylene ether) and solvent; and isolating the capped poly(arylene ether) by a total isolation method. The success of this method is particularly surprising because washing with the concentrated aqueous base was expected to cause base-catalyzed decomposition of the capped poly(arylene ether), yet no significant decomposition was observed.

In one step of the method, a poly(arylene ether) is reacted with a capping agent in the presence of a solvent and a capping catalyst to form a capping reaction mixture comprising a capped poly(arylene ether), solvent, capping agent, capping catalyst, and a capping byproduct. The poly(arylene ether) comprises at least one phenolic hydroxy group capable of reacting with the capping agent. Suitable poly(arylene ether)s include those comprising repeating structural units having the formula

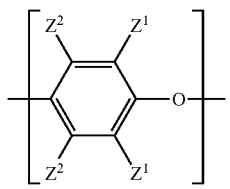

wherein each occurrence of $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each occurrence of $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms. As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as substituted, it can, optionally, contain heteroatoms over and above the carbon and hydrogen members of the substituent residue. Thus, when specifically described as substituted, the hydrocarbyl residue can also contain one or more heteroatoms such as halogens, oxygen, nitrogen, sulfur, silicon, or phosphorus. When substituted, the hydrocarbyl residue can contain the heteroatoms pendant to or within the backbone of the hydrocarbon residue. As one example, $Z^1$ can be a di-n-butylaminomethyl group formed by reaction of the methyl group of a terminal 1-hydroxy-2,6-dimethylphenylene residue with the di-n-butylamine component of an oxidative polymerization catalyst.

In some embodiments, the poly(arylene ether) comprises 2,6-dimethyl-1,4-phenylene ether units, 2,3,6-trimethyl-1,4-phenylene ether units, or a combination thereof. In some embodiments, the poly(arylene ether) is a poly(2,6-dimethyl-1,4-phenylene ether). As noted above, the poly(arylene ether) can comprise molecules having aminoalkyl-containing end group(s), typically located in a position ortho to the hydroxy group. Also frequently present are tetramethyldiphenoquinone (TMDQ) end groups, typically obtained from 2,6-dimethylphenol-containing reaction mixtures in which tetramethyldiphenoquinone by-product is present. The poly(arylene ether) can be in the form of a homopolymer, a random copolymer, a graft copolymer, an ionomer, or a block copolymer, as well as combinations comprising at least one of the foregoing.

The poly(arylene ether) can comprise one or more than one phenolic hydroxy group. When the poly(arylene ether) comprises one phenolic hydroxy group, it is referred to as a monofunctional poly(arylene ether). When the poly(arylene ether) comprises more than one phenolic hydroxy group, it is referred to as a polyfunctional poly(arylene ether). In some embodiments, the polyfunctional poly(arylene ether) is a bifunctional poly(arylene ether) (that is, a poly(arylene ether) having two phenolic hydroxy groups) having the structure

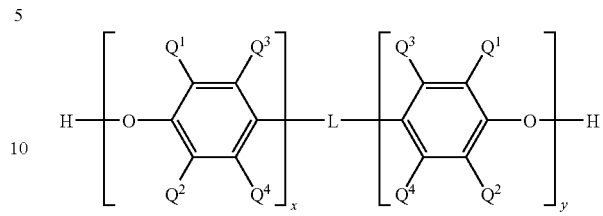

wherein $Q^1$ and $Q^2$ are identical within each phenylene ether unit and selected from the group consisting of halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, and $C_2$-$C_{12}$ halohydrocarbyloxy wherein at least two carbon atoms separate the halogen and oxygen atoms; each occurrence of $Q^3$ and $Q^4$ is independently selected from the group consisting of hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, and $C_2$-$C_{12}$ halohydrocarbyloxy wherein at least two carbon atoms separate the halogen and oxygen atoms; x and y are independently 0 to about 30, specifically 0 to about 20, more specifically 0 to about 15, still more specifically 0 to about 10, even more specifically 0 to about 8, provided that the sum of x and y is at least 2, specifically at least 3, more specifically at least 4; and L has the structure

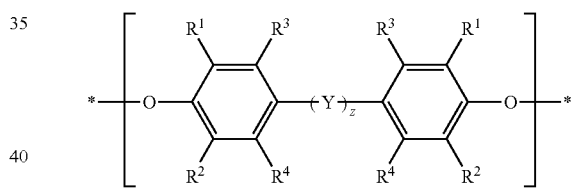

wherein each occurrence of $R^1$ and $R^2$ and $R^3$ and $R^4$ is independently selected from the group consisting of hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, and $C_2$-$C_{12}$ halohydrocarbyloxy wherein at least two carbon atoms separate the halogen and oxygen atoms; z is 0 or 1; and Y has a structure selected from the group consisting of

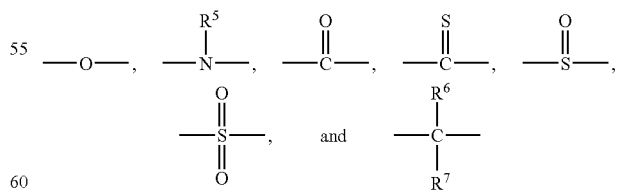

wherein each occurrence of $R^5$ is independently selected from the group consisting of hydrogen and $C_1$-$C_{12}$ hydrocarbyl, and each occurrence of $R^6$ and $R^7$ is independently selected from the group consisting of hydrogen, $C_1$-$C_{12}$ hydrocarbyl, and $C_1$-$C_6$ hydrocarbylene wherein $R^6$ and $R^7$ collectively form a $C_4$-$C_{12}$ alkylene group. In some embodiments, each occurrence of $Q^1$ and $Q^2$ is methyl, each occurrence of $Q^3$ is hydrogen, each occurrence of $Q^4$ is hydrogen or methyl, the sum of x and y is 2 to about 15, each occurrence of $R^1$ and $R^2$ and $R^3$ and $R^4$ is independently hydrogen or methyl, and Y has the structure

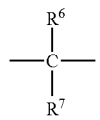

wherein each occurrence of $R^6$ and $R^7$ is independently selected from the group consisting of hydrogen, $C_1$-$C_{12}$ hydrocarbyl, and $C_1$-$C_6$ hydrocarbylene wherein $R^6$ and $R^7$ collectively form a $C_4$-$C_{12}$ alkylene group.

In the bifunctional poly(arylene ether) structure above, there are limitations on the variables x and y, which correspond to the number of phenylene ether repeating units at two different places in the bifunctional poly(arylene ether) molecule. In the structure, x and y are independently 0 to about 30, specifically 0 to about 20, more specifically 0 to about 15, even more specifically 0 to about 10, yet more specifically 0 to about 8. The sum of x and y is at least 2, specifically at least 3, more specifically at least 4. A particular polyfunctional poly(arylene ether) can be analyzed by proton nuclear magnetic resonance spectroscopy ($^1$H NMR) to determine whether these limitations are met for the entire resin, on average. Specifically, $^1$H NMR can distinguish between resonances for protons associated with internal and terminal phenylene ether groups, and internal and terminal residues of a polyhydric phenol, as well as other terminal residues. It is therefore possible to determine the average number of phenylene ether repeat units per molecule, and the relative abundance of internal and terminal residues derived from dihydric phenol.

In some embodiments, the polyfunctional poly(arylene ether) is a bifunctional poly(arylene ether) having the structure

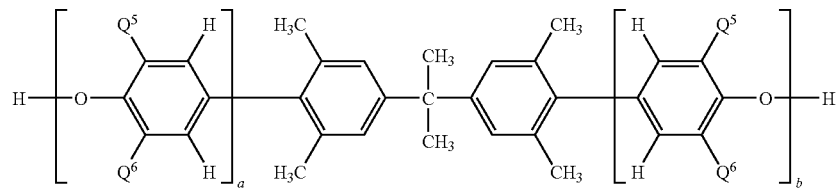

wherein each occurrence of $Q^5$ and $Q^6$ is independently methyl or di-n-butylaminomethyl; and each occurrence of a and b is independently 0 to about 20, provided that the sum of a and b is at least 2, specifically at least 3, more specifically at least 4. Bifunctional poly(arylene ether)s having this structure can be synthesized by oxidative copolymerization of 2,6-xylenol and 2,2-bis(3,5-dimethyl-4-hydroxyphenyl)propane in the presence of a catalyst comprising di-n-butylamine.

Poly(arylene ether)s can be prepared by oxidative polymerization of monomers comprising a monohydric phenol, such as 2,6-dimethylphenol, 2,3,6-trimethylphenol, or a mixture thereof. Many other suitable monohydric phenols are known in the art. Polyfunctional poly(arylene ether)s (that is, poly(arylene ether)s having two or more phenolic hydroxy groups) can be prepared by oxidative copolymerization of a monohydric phenol and a polyhydric phenol. Suitable polyhydric phenols include, for example, 3,3',5,5'-tetramethyl-4,4'-biphenol, 2,2-bis(3-methyl-4-hydroxyphenyl)propane, 2,2-bis(3,5-dimethyl-4-hydroxyphenyl)propane, 1,1-bis(4-hydroxyphenyl)methane, 1,1-bis(4-hydroxyphenyl)ethane, 2,2-bis(4-hydroxyphenyl)propane 2,2-bis(4-hydroxyphenyl) butane, 2,2-bis(4-hydroxyphenyl)octane, 1,1-bis(4-hydroxyphenyl)propane, 1,1-bis(4-hydroxyphenyl)-n-butane, bis(4-hydroxyphenyl)phenylmethane, 1,1-bis(4-hydroxy-3-methylphenyl)cyclohexane, 1,1-bis(4-hydroxy-3,5-dimethylphenyl)cyclopentane, 1,1-bis(4-hydroxy-3,5-dimethylphenyl)cyclohexane, 1,1-bis(4-hydroxy-3-methylphenyl)cycloheptane, 1,1-bis(4-hydroxy-3,5-dimethylphenyl)cycloheptane, 1,1-bis(4-hydroxy-3-methylphenyl)cyclooctane, 1,1-bis(4-hydroxy-3,5-dimethylphenyl)cyclooctane, 1,1-bis(4-hydroxy-3-methylphenyl)cyclononane, 11,1-bis(4-hydroxy-3,5-dimethylphenyl)cyclononane, 1,1-bis(4-hydroxy-3-methylphenyl)cyclodecane, 1,1-bis(4-hydroxy-3,5-dimethylphenyl)cyclodecane, 1,1-bis(4-hydroxy-3-methylphenyl)cycloundecane, 1,1-bis(4-hydroxy-3,5-dimethylphenyl)cycloundecane, 1,1-bis(4-hydroxy-3-methylphenyl)cyclododecane, 1,1-bis(4-hydroxy-3,5-dimethylphenyl)cyclododecane, 1,1-bis(4-hydroxy-3-t-butylphenyl)propane, 2,2-bis(4-hydroxy-2,6-dimethylphenyl)propane 2,2-bis(4-hydroxy-3-bromophenyl)propane, 1,1-bis(4-hydroxyphenyl) cyclopentane, 1,1-bis(4-hydroxyphenyl)cyclohexane, 1,1,1-tris(3,5-dimethyl-4-hydrxyphenyl)ethane 1,1,1-tris(3-methyl-4-hydroxyphenyl)ethane, 1,3,5-tris(3,5-dimethyl-4-hydroxyphenyl-1-keto)benzene, 1,3,5-tris(3,5-dimethyl-4-hydroxyphenyl-1-isopropylidene)benzene, 2,2,4,4-tetrakis(3-methyl-4-hydroxyphenyl)pentane, 2,2,4,4-tetrakis(3,5-dimethyl-4-hydroxyphenyl)pentane, 1,1,4,4-tetrakis(3-methyl-4-hydroxyphenyl)cyclohexane, 1,1,4,4-tetrakis(3,5-dimethyl-4-hydroxyphenyl)cyclohexane, 1,3,5-tris(3,5-dimethyl-4-hydroxyphenyl)benzene, 1,3,5-tris(3-methyl-4-hydroxyphenyl)benzene, 2,6-bis(2-hydroxy-5-methylbenzyl)-4-methylphenol, 4,6-dimethyl-2,4,6-tris(4-hydroxy-3-methylphenyl)-2-heptene, 4,6-dimethyl-2,4,6-tris(4-hydroxy-3,5-dimethylphenyl)-2-heptene, 4,6-dimethyl-2,4,6-tris(4-hydroxy-3-methylphenyl)heptane, 4,6-dimethyl-2,4,6-tris(4-hydroxy-3-methylphenyl)heptane, 2,4-bis(4-hydroxy-3-methylphenylisopropyl)phenol, 2,4-bis(4-hydroxy-3,5-dimethylphenylisopropyl)phenol, tetrakis(4-hydroxy-3-methylphenyl)methane, tetrakis(4-hydroxy-3,5-dimethylphenyl)methane, tetrakis(4-[4-hydroxy-3-methylphenylisopropyl]phenoxy)methane, tetrakis(4-[4-hydroxy-3,5-dimethylphenylisopropyl]-phenoxy)methane, and mixtures thereof. In some embodiments, the polyhydric phenol comprises 3 to 8 phenolic hydroxy groups per molecule. In some embodiments, the polyfunctional poly(arylene ether) is a bifunctional poly(arylene ether) prepared by oxidative copolymerization of 2,6-dimethylphenol and 2,2-bis(3,5-dimethyl-4-hydroxyphenyl)propane.

In some embodiments, the polyhydric phenol is a dihydric phenol having the structure

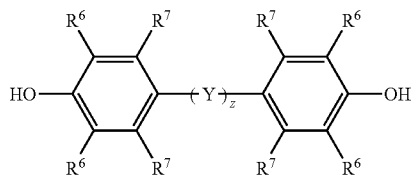

wherein z is 0 or 1; each occurrence of $R^6$ and $R^7$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and Y has a structure selected from

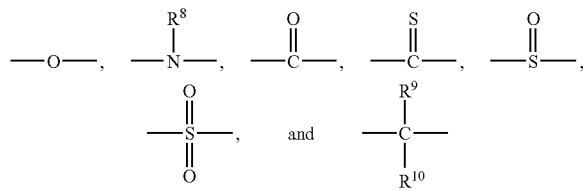

wherein each occurrence of $R^8$, $R^9$, and $R^{10}$ is independently selected from hydrogen and $C_1$-$C_{12}$ hydrocarbyl.

Polyfunctional poly(arylene ether)s can also be prepared by a process comprising oxidatively polymerizing a monohydric phenol in the presence of a catalyst under conditions suitable to form a corresponding poly(arylene ether) and a corresponding diphenoquinone; separating the poly(arylene ether) and the diphenoquinone from the catalyst; and equilibrating the poly(arylene ether) and the diphenoquinone to form a poly(arylene ether) having two terminal hydroxy groups. An illustrative example of a corresponding poly(arylene ether) is poly(2,6-dimethyl-1,4-phenylene ether) prepared from oxidative polymerization of 2,6-dimethylphenol. An illustrative example of a corresponding diphenoquinone is 3,3',5,5'-tetramethyl-4,4'-diphenoquinone formed by oxidation of 2,6-dimethylphenol. When this preparation method is used, it may be necessary to purify the bifunctional poly(arylene ether) to achieve a polydispersity index less than 2.2. An illustrative initial reaction mixture composition for oxidative copolymerization of 2,6-dimethylphenol and 2,2-bis(3,5-dimethyl-4-hydroxyphenyl)propane is as follows: 50192 parts by weight of 2,6-dimethylphenol, 109581 parts by weight of toluene, 503 parts by weight of di-n-butylamine, 1175 parts by weight of dimethyl-n-butylamine, 264 parts by weight of a diamine mix containing N,N'-dibutylethylenediamine and didecyl dimethyl ammonium chloride, and 353 parts by weight of a catalyst mix containing 6.5 weight percent $Cu_2O$ in aqueous hydrogen bromide. The polymerization reaction is conducted by controlling the temperature and oxygen concentration in the reaction vessel. The concentration of copper in the polymerization reaction mixture is about 125 parts per million by weight based on the total weight of the reaction mixture, or about 420 parts per million by weight based on the weight of poly(arylene ether) product. The concentration of poly(arylene ether) product in the polymerization reaction mixture is 29.8 weight percent based on the total weight of the reaction mixture. The product bifunctional poly(arylene ether) has an intrinsic viscosity of 0.06 deciliter per gram measured in chloroform at 25° C.

Polyfunctional poly(arylene ether)s can also be prepared by a so-called redistribution reaction in which a monofunctional poly(arylene ether) is equilibrated with a polyhydric phenol, optionally in the presence of an oxidizing agent. Redistribution reactions are known in the art and described, for example, in U.S. Pat. Nos. 3,496,236 to Cooper et al. and U.S. Pat. No. 5,880,221 to Liska et al. When this preparation method is used, it may be necessary to purify the polyfunctional poly(arylene ether) to achieve a polydispersity index less than 2.2.

The method of preparing a capped poly(arylene ether) is applicable to poly(arylene ether)s having a broad range of intrinsic viscosities. For example, the poly(arylene ether) can have an intrinsic viscosity of 0.04 to 1.0 deciliters per gram (dL/g), specifically 0.06 to 0.6 dL/g, more specifically 0.09 to 0.4 dL/g, still more specifically 0.09 to 0.3 dL/g, even more specifically 0.09 to 0.2 dL/g, yet more specifically 0.09 to 0.15 dL/g, even more specifically 0.09 to 0.12 dL/g, all as measured in chloroform at 25° C. It will be understood that the same intrinsic viscosity limitations can apply to the capped poly(arylene ether).

Capping agents capable of reaction with poly(arylene ether)s to form capped poly(arylene ether)s are known in the art. See, for example, U.S. Pat. Nos. 4,562,243 and 4,634,742 and 4,665,137 to Percec, U.S. Pat. No. 4,663,402 to Percec et al., U.S. Pat. Nos. 6,306,978 B1 and 6,384,176 to Braat et al., U.S. Pat. No. 6,627,704 B2 to Yeager et al., and U.S. Pat. No. 6,962,965 to Yeager; and U.S. Statutory Invention Registration H521 to Fan. Among the types of capping agents that can be used are, for example, halohydrocarbons (such as chloromethylstyrene and allyl chloride), carboxylic acid halides (such as acetyl chloride, acryloyl chloride, and methacryloyl chloride), carboxylic acid esters (such as phenyl salicylate), carboxylic acid anhydrides (such as acetic anhydride, acrylic anhydride, and methacrylic anhydride), carbonate esters (such as diphenyl carbonate and bis(4-vinylphenyl)carbonate), isocyanates (including diisocyanates), and epichlorohydrin.

The molar ratio of the capping agent to phenolic hydroxy groups on the poly(arylene ether) is chosen to balance the need for rapid and complete capping (which favors high ratios) with the need to avoid introducing excess reagents that increase the impurity burden in the washing step (which favors low ratios). It has been observed that choosing a molar ratio of capping agent to hydroxy groups on the poly(arylene ether) of 1 to 3, specifically 1.05 to 2, more specifically 1.1 to 1.5, strikes a good balance between these competing demands.

The poly(arylene ether) is reacted with the capping agent in the presence of a solvent. Suitable solvents include halogenated aliphatic hydrocarbon solvents, aromatic hydrocarbon solvents, halogenated aromatic hydrocarbon solvents, and combinations thereof. In some embodiments, the solvent is an aromatic hydrocarbon comprising at least one aliphatic carbon-carbon double bond and/or at least one aliphatic carbon-carbon triple bond. Examples of such aromatic hydrocarbon solvents comprising at least one aliphatic carbon-carbon double bond and/or at least one aliphatic carbon-carbon triple bond include styrene, vinyl $C_1$-$C_6$ alkylbenzenes (such as vinyl toluenes), divinylbenzene, allylbenzene, 1-ethynylbenzene, and the like, and mixtures thereof. In some embodiments, the solvent is toluene.

The reaction of the poly(arylene ether) with the capping agent is also conducted in the presence of a capping catalyst. The type of capping catalyst used will depend on the type of capping agent used. For example, when the capping agent is a halohydrocarbon, a carboxylic acid halide, a carboxylic acid ester, or a carboxylic acid anhydride, the capping catalyst is typically a Bronsted-Lowry base (that is, a base capable of accepting a proton from a terminal hydroxyl group of the poly(arylene ether)). Bronsted-Lowry bases include, for example, alkali metal hydroxides (such as lithium hydroxide, sodium hydroxide, and potassium hydroxide), unsubstituted and substituted ammonium hydroxides (such as ammonium hydroxide and tetramethylammonium hydroxide), and amines (including primary, secondary, and specifically tertiary amines such as 4-(N,N-dimethylamino)pyridine).

The type of capping byproduct used will also depend on the type of capping agent used. When the capping agent is a halohydrocarbon or a carboxylic acid halide, the capping byproduct will typically be a halide ion (such as chloride ion). When the capping agent is a carboxylic acid ester or a carbonate ester, the capping byproduct will typically be an alcohol (such as methanol, or phenol). When the capping agent is a carboxylic acid anhydride, the capping byproduct will typically be a carboxylic acid (such as acetic acid, or acrylic acid, or methacrylic acid).

One example of a poly(arylene ether) capping procedure is the reaction of an uncapped poly(arylene ether) with methacrylic anhydride as capping agent in the presence of 4-(N,N-dimethylamino)pyridine as capping catalyst. In this reaction, the primary capping byproduct is methacrylic acid.

After a capping reaction mixture is formed by reacting a poly(arylene ether) with a capping agent in the presence of a solvent and a capping catalyst, the capping reaction mixture is washed with a basic aqueous solution comprising at least 5 weight percent of a base to yield a purified solution comprising capped poly(arylene ether) and solvent. The concentration of base in the basic aqueous solution can specifically be 5 to 15 weight percent, more specifically 10 to 15 weight percent, based on the total weight of the basic aqueous solution. Note that the aqueous wash method disclosed in U.S. Pat. No. 6,897,282 to Freshour et al. uses aqueous sodium hydroxide at a maximum concentration of about 1 normal, corresponding to about 4 weight percent sodium hydroxide—a substantially lower base concentration than used in the present method. As mentioned above, it is very surprising that the capped poly(arylene ether) can tolerate exposure to such concentrated base solutions without suffering substantial decomposition.

The Freshour patent also teaches that a higher poly(arylene ether) concentration in solution during washing is desirable because it is associated with decreased concentrations of residual impurities in the isolated poly(arylene ether). Specifically, a solution concentration of 50 weight percent poly(arylene ether) was favored over a solution concentration of 21 weight percent poly(arylene ether). However, the present inventors have observed that using high poly(arylene ether) concentration in solution can lead to emulsification of the aqueous and organic phases, making separation of those phases very difficult. The present inventors have found that better results are achieved by proceeding contrary to the express teachings of the Freshour patent by using a relatively low poly(arylene ether) concentration in solution. Specifically, the present inventors have found that good impurity separation is achieved and emulsification is avoided when the capping reaction mixture comprises 5 to 25 weight percent, specifically 8 to 20 weight percent, more specifically 12 to 18 weight percent, of the capped poly(arylene ether) during the washing with the basic aqueous solution. In many cases, it is desirable to use a higher concentration of poly(arylene ether) during the capping step, so the method can, optionally, comprise adjusting the concentration of (e.g., diluting) the capped poly(arylene ether) in the capping reaction mixture to 5 to 25 weight percent prior to the washing with the basic aqueous solution.

The base used in the basic aqueous solution can be any base effective to improve the extraction of capping-related impurities from the capping reaction mixture. Suitable bases include, for example, alkali metal hydroxides, water soluble primary organic amines, water soluble secondary organic amines, water soluble tertiary organic amines, and combinations thereof. In some embodiments, the base is an alkali metal hydroxide, specifically sodium hydroxide.

The present inventors have also observed that the efficiency of the washing step is improved when conducted at elevated temperature. For example, washing the capping reaction mixture with a basic aqueous solution can be conducted at a temperature of 60 to 95° C., specifically 70 to 90° C., more specifically 75 to 85° C.

The present inventors have also observed that the efficiency of the washing step is improved if the ratio of the basic aqueous solution viscosity to the capping reaction mixture viscosity is 0.5:1 to 3:1 at the temperature at which washing is conducted.

Yet another way in which the present method can differ from the washing method of the Freshour patent is in the volume ratio of poly(arylene ether) solution and aqueous wash. Freshour et al. used water/solution ratios of 1:1 to 2:1 and expressed a preference for the higher ratio because it was associated with lower concentrations of impurities in the isolated poly(arylene ether). However, the present inventors have found that efficient extraction can be achieved when the weight ratio of the capping reaction mixture to the basic aqueous solution is 2:1 to 25:1, specifically 3:1 to 20:1, more specifically 4:1 to 20:1.

Within the constraint that the basic aqueous solution comprises at least 1.2 moles per liter of base, the base concentration can also be specified in terms of a molar ratio with the capping agent. For example, the present inventors have observed that when the capping agent is an acid anhydride, and the basic aqueous solution can comprise the base in an amount of 0.5 to 2 moles per mole of equivalent free acid, wherein equivalent free acid is the sum of the moles of acid produced as a by-product of the capping reaction and two times the moles of excess capping agent. Specifically, the basic aqueous solution can comprise the base in an amount of 0.6 to 1.5 moles per mole of equivalent free acid, more specifically 0.7 to 1 moles per mole of equivalent free acid. In other embodiments, the basic aqueous solution can comprise the base in an amount of 0.6 to 0.9 moles per mole of equivalent free acid, specifically 0.7 to 0.8 moles per mole of equivalent free acid.

In some embodiments, the capping step is carried on a polymerization reaction mixture that comprises an oxidative polymerization catalyst metal, such as copper or manganese. In other words, the method can comprise oxidatively polymerizing a monohydric phenol in the presence of a solvent and a catalyst metal to form a polymerization reaction mixture comprising the poly(arylene ether), solvent, and catalyst metal. In some embodiments, solvent is removed from the polymerization reaction mixture prior to the capping step.

The catalyst metal can be removed from the polymerization reaction mixture prior to the capping reaction. Alternatively, the catalyst metal can be removed by chelation after the capping reaction and before the basic basic aqueous washing step. Alternatively, the catalyst metal can be removed by chalation concurrently with the basic aqueous washing step. Thus, in some embodiments, the basic aqueous solution further comprises a chelant. Examples of chelants include polyalkylenepolyamine polycarboxylic acids, aminopolycarboxylic acids, aminocarboxylic acids, polycarboxylic acids, alkali metal salts of the foregoing acids, alkaline earth metal salts of the foregoing acids, mixed alkali metal-alkaline earth metal salts of the foregoing acids, and the like, and combinations thereof. In some embodiments, the chelant is an alkali metal salt of nitrilotriacetic acid. In some embodiments, the chelant is used in an amount of about 1 to about 15 moles per mole of catalyst metal. In yet another alternative embodiment, the catalyst metal can be removed after the basic aqueous washing step.

Independent of when the chelation of catalyst metal is conducted, the aqueous chelant solution may be separated from the capping reaction mixture via a process comprising a liquid-liquid separation technique such as decantation or centrifugation. When centrifugation is employed, the force generated by centrifugation may be 1,000 to 15,000 g-forces, specifically 2,000 to 10,000 g-forces.

When the poly(arylene ether) is synthesized in the presence of a polymerization catalyst comprising copper, the isolated capped poly(arylene ether) can comprise less than or equal to 15 parts per million by weight of catalyst metal, specifically 0.1 to 8 parts per million by weight of catalyst metal, more specifically 0.1 to 5 part per million by weight of catalyst metal, based on the weight of the isolated capped poly(arylene ether).

The method can comprise more than one aqueous washing step. For example, in some embodiments the method further comprises washing the capping reaction mixture with water. It will be understood that the term "water" includes tap water, deionized water, various other purified waters, and water to which small amounts (<1 weight percent) of salts and/or other modifiers have been added. In some embodiments, the water has a conductivity of 0.05 to 1 microsiemens at 25° C. As another example, in some embodiments the method comprises washing the capping reaction mixture with an acidic aqueous solution. Use of an acidic wash is particularly effective for extracting amine impurities, such as the 4-(N,N-dimethylamine)pyridine catalyst used with (meth)acrylic anhydride as a capping agent. Suitable acids include, for example, hydrochloric acid, sulfuric acid, formic acid, acetic acid, propionic acid, oxalic acid, citric acid, and the like, and mixtures thereof. As used herein, the prefix (meth)acryl- comprises acryl- and methacryl-. For example, the term "(meth)acrylic anhydride" includes "acrylic anhydride" and "methacrylic anhydride". In some embodiments, the acid is acetic acid. The acid concentration in the acidic aqueous wash can be 0.2 to 1 mole per liter, specifically 0.25 to 0.8 mole per liter, more specifically 0.3 to 0.6 moles per liter.

The time use for each of the aqueous washing steps will depend on factors including the poly(arylene ether) concentration in the capping reaction mixture, the capping agent type and concentration, the capping catalyst type and concentration, the aqueous solution composition, the washing temperature, and the type of equipment used. Typical wash times are 1 to 240 minutes, specifically 2 to 180 minutes, more specifically 5 to 60 minutes. Normally the wash is conducted under mild agitation conditions to prevent the formation of an emulsion. Normal agitation power input is 0.5 to 25 kilojoules per kilogram of solution.

In some embodiments, the capping reaction mixture is extracted with an aqueous solution comprising an alkali metal hydroxide, an aqueous solution comprising acetic acid, and water. Washing with the aqueous solution comprising an alkali metal hydroxide can be conducted before washing with the aqueous solution comprising acetic acid, which in turn can be conducted before washing with water.

In some embodiments, the capping reaction mixture is extracted with a first aqueous solution comprising an alkali metal hydroxide, a second aqueous solution comprising an alkali metal hydroxide, an aqueous solution comprising acetic acid, and water. Washing with the first and second aqueous solutions comprising alkali metal hydroxide can be conducted before washing with the aqueous solution comprising acetic acid, which in turn can be conducted before washing with water.

One embodiment comprises washing the capping reaction mixture with a first aqueous solution comprising an alkali metal hydroxide, a second aqueous solution comprising an alkali metal hydroxide, and water. Another embodiment comprises washing the capping reaction mixture with a first aqueous solution comprising an alkali metal hydroxide, a second aqueous solution comprising an alkali metal hydroxide, an aqueous solution comprising acetic acid, and water. Another embodiment comprises washing the capping reaction mixture with a first water wash, an aqueous solution comprising an alkali metal hydroxide, an aqueous solution comprising acetic acid, and a second water wash. Another embodiment comprises washing the capping reaction mixture with a first aqueous solution comprising an alkali metal hydroxide, a second aqueous solution comprising an alkali metal hydroxide, a first water wash, and a second water wash.

Equipment that can be used for the aqueous washing steps, includes, for example, liquid-liquid centrifuges, decanters, counter-current extraction equipment, and combinations of the foregoing equipment.

The same equipment may be used for multiple washing steps. For example, when the process is conducted in batch mode, the equipment used to wash the capping reaction mixture with a basic aqueous solution can be used for subsequent washing steps. Such subsequent washing steps can include, for example, washing with a second basic aqueous solution, an acidic aqueous solution, or water. Alternatively, when the process is conducted in a continuous mode, different equipment is used for each washing step.

The method includes isolating the capped poly(arylene ether) by a total isolation method. The term "total isolation method" refers to an isolation method that removes volatile components. Suitable total isolation methods include devolatilizing extrusion, spray drying, wiped film evaporation, flake evaporation, flash devolatilization (for example, using a flash vessel with a melt pump), and combinations of the foregoing methods. In some embodiments, the total isolation method comprises devolatilizing extrusion.

One specific embodiment is a method of preparing a capped poly(arylene ether), comprising: reacting a poly (arylene ether) with a capping agent in the presence of a solvent and a capping catalyst to form a capping reaction mixture comprising a capped poly(arylene ether), solvent, capping agent, capping catalyst, and a capping byproduct; wherein the poly(arylene ether) is the product of oxidatively polymerizing monomers comprising 2,6-xylenol and 2,2-bis (3,5-dimethyl-4-hydroxyphenyl)propane; wherein the capping agent is (meth)acrylic anhydride; wherein the molar ratio of (meth)acrylic anhydride to hydroxy groups on the poly(arylene ether) is 1 to 3; wherein the solvent is toluene; wherein the capping catalyst is 4-(N,N-dimethylamino)pyridine; and wherein the capping byproduct is (meth)acrylic acid; adjusting the concentration of the capped poly(arylene ether) in the capping reaction mixture to 5 to 25 weight percent prior to the washing with the basic aqueous solution; washing the capping reaction mixture with a basic aqueous solution comprising 5 to 15 weight percent of sodium hydroxide to yield a first purified solution comprising capped poly (arylene ether) and solvent; wherein washing the capping reaction mixture with a basic aqueous solution is conducted at a temperature of 60 to 95° C.; washing the first purified solution with an acidic aqueous solution comprising 0.2 to 1 mole per liter acetic acid to yield a second purified solution comprising capped poly(arylene ether) and solvent; wherein washing the first purified solution with an acidic aqueous solution is conducted at a temperature of 60 to 95° C.; washing the second purified solution with water to yield a third purified solution comprising capped poly(arylene ether) and solvent; wherein washing the second purified solution with water is conducted at a temperature of 60 to 95° C.; and isolating the capped poly(arylene ether) by devolatilizing extrusion.

Another embodiment is a (meth)acrylate-capped poly (arylene ether) prepared by the method of the preceding paragraph and comprising less than or equal to 2,500 parts per million by weight of (meth)acryloyl groups as (meth)acrylic acid or (meth)acryloyl anhydride, and less than or equal to 1,000 parts per million by weight of 4-(N,N-dimethylamino) pyridine.

The invention extends to a (meth)acrylate-capped poly (arylene ether) prepared by the above methods and comprising less than or equal to 2,500 parts per million by weight of (meth)acryloyl groups as (meth)acrylic acid or (meth)acryloyl anhydride; and less than or equal to 1,000 parts per million by weight of 4-(N,N-dimethylamino)pyridine, specifically less than or equal to 500 parts per million by weight of 4-(N,N-dimethylamino)pyridine, more specifically less than or equal to 200 parts per million by weight of 4-(N,N-dimethylamino)pyridine, still more specifically less than or equal to 100 parts per million by weight of 4-(N,N-dimethylamino)pyridine. The low levels of impurities distinguish this (meth)acrylate-capped poly(arylene ether) from prior art (meth)acrylate-capped poly(arylene ether)s.

The invention is further illustrated by the following non-limiting examples.

PREPARATIVE EXAMPLE 1

This example describes a general procedure for preparing a solution of a bifunctional poly(arylene ether). A bifunctional copolymer of 2,6-dimethylphenol (2,6-xylenol; 2,6-X) and 2,2-bis(3,5-dimethyl-4-hydroxyphenyl)propane (tetramethylbisphenol A; TMBPA) was prepared by oxidative copolymerization in toluene in the presence of a copper amine catalyst. The monomer mixture consisted of 83 weight percent 2,6-dimethylphenol and 17 weight percent 2,2-bis(3,5-dimethyl-4-hydroxyphenyl)propane. The catalyst copper and other water soluble components were either allowed to remain in the reaction mixture or extracted with an aqueous trisodium nitrilotriacetate (NTA) solution. The resulting bifunctional poly(arylene ether) (PPE) resin had an intrinsic viscosity (IV) of about 0.09 deciliter per gram (dL/g), measured in chloroform at 25° C. The terminal hydroxy groups of the bifunctional PPE were methacrylate-capped by reaction with methacrylic anhydride (MAA; 1.1 moles per mole of free —OH groups) in the presence of N,N-dimethylaminopyridine (DMAP; 0.2 moles per mole of free —OH groups) as capping catalyst to yield a 53 weight percent solution of methacrylate-capped bifunctional poly(arylene ether) in toluene. The bifunctional poly(arylene ether) had an intrinsic viscosity of 0.09 dL/g measured at 25° C. in chloroform.

COMPARATIVE EXAMPLES 1 AND 2

These examples illustrate the importance of reducing the levels of residual methacrylic acid, methacrylic anhydride, and capping catalyst in the isolated bifunctional poly(arylene ether).

The samples designated Comparative Example 1 ("C. Ex. 1") was prepared from the 53 weight percent solution of methacrylate-capped bifunctional poly(arylene ether) in toluene described in Preparative Example 1. The methacrylate-capped bifunctional poly(arylene ether) was isolated from the 53 weight percent solution by precipitation with methanol (3 weight parts methanol per 1 weight part solution). After precipitation, the slurry was filtered and the cake was rinsed once with methanol before drying in an oven.

Comparative Example 1 starting with a similar bifunctional copolymer of 2,6-dimethylphenol and 2,2-bis(3,5-dimethyl-4-hydroxyphenyl), but the capping and precipitation procedures were different. The methacrylate capping of this batch was done using 1.7 mole methacrylic anhydride per mole of poly(arylene ether) —OH groups and 0.2 mole DMAP per mole of —OH groups. The capped bifunctional polymer was isolated by antisolvent precipitation with isopropanol. The weight ratio of isopropanol to solution was 3:1. After precipitation, the slurry was filtered and the cake was reslurried in isopropanol. The second slurry was filtered and the resulting cake was dried in an oven.

Laminates were prepared by impregnating glass cloth (17.78 centimeters (7 inches) by 19.05 centimeters (7.5 inches)) with a toluene solution of resin. After mixing the resin solution for 30 minutes, the resin solution was heated to 65° C. for 15-30 seconds. After two cycles of dipping the glass cloth, the glass cloth was dried overnight by evaporation to obtain about 50 weight percent, impregnated curable composition (i.e., a "prepreg"). Laminates were produced by stacking several prepregs, compression molding for four minutes at a temperature of 150-180° C. at a pressure of 13.34 kilonewtons (3000 pounds), and cooling for three minutes in a hot press. The average thickness for each laminate was determined using a micrometer.

A solder float test was conducted according to IPC-TM-650-2.4.13. Briefly, the specimen (50 mm×50 mm) was floated on the surface of the molten solder for 10 seconds and then removed and examined. The laminate was visually examined for blistering, shrinkage, distortion, or melting. A "pass" rating would be for a laminate with no visual signs of blistering, shrinkage, distortion, or melting.

The results are in Table 1 below. They show that the Comparative Example 1 laminate prepared with a poly(arylene ether) having a residual methacrylic acid concentration of 3,116 ppm, a residual methacrylic anhydride concentration of 269 ppm, and a dimethylaminopyridine concentration of 10,827 ppm failed the solder float test, whereas the Comparative Example 2 laminate prepared with a poly(arylene ether) having a residual methacrylic acid concentration of 1,810 ppm, a residual methacrylic anhydride concentration of 231 ppm, and a dimethylaminopyridine concentration of 2,102 ppm passed the solder float test.

TABLE 1

|  | C. Ex. 1 | C. Ex. 2 |
|---|---|---|
| Triallyl isocyanurate (pbw) | 100 | 100 |
| MA-PPE (pbw) | 100 | 100 |
| 2,5-bis(t-butyl peroxy)-2,5-dimethyl-3-hexyne (pbw) | 2.02 | 2.02 |
| tert-butylcatechol (pbw) | 0.205 | 0.205 |
| Resin in laminate (wt %) | 49.6 | 50.2 |
| Laminate thickness (mm) | 1.5 | 1.47 |
| MAOH (ppm) in MA-PPE | 3,116 | 1,810 |
| MAA (ppm) in MA-PPE | 269 | 231 |

TABLE 1-continued

|  | C. Ex. 1 | C. Ex. 2 |
|---|---|---|
| DMAP (ppm) in MA-PPE | 10,827 | 2,102 |
| Solder float test |  |  |
| @ 260 C. | Fail | Pass |
| @ 288 C. | Fail | Pass |

EXAMPLES 1-5

Examples 1-5 illustrate the effect the concentration of the solids in the organic phase and the concentration of the aqueous base have on the retention of water in the organic phase during the extraction process.

After capping the bifunctional poly(arylene ether), the resulting toluene solution (44.4% solids) was purified as follows: a 10 gram aliquot of the solution was diluted to the required weight percent solids by adding toluene and the diluted solution was put in an oil bath at 80° C. for 30 minutes. The required amount of deionized water and 50 weight percent NaOH solution were added to obtain the desired NaOH weight percent in the aqueous phase; the typical addition was approximately 1 weight part of aqueous solution per 7 parts of toluene solution. Right after addition of the aqueous phase, the mixture was shaken by hand for one minute, and then the mixture was put back in the oil bath at 80° C. for 30 minutes. After this time, the mixture was taken out of the oil bath and processed in a lab centrifuge at 3,000 rotations per minute (rpm) for 30 minutes. The sample was taken out of the centrifuge and the two phases were separated by pipetting out the top phase. The organic phase was given a second or third wash as indicated, following the same procedure described above.

The resulting organic phases were analyzed for water content by gas chromatography. The results are shown in Table 2.

It can be seen from Table 2 that the retention of water in the organic phase increases with increasing concentration of the aqueous base, in this case NaOH, and increasing concentration of the solids in the toluene mixture. In Example 1, where the concentration of solids in the organic phase is 15 weight percent and the concentration of the aqueous base is 4.1-4.7 weight percent, 375 ppm of water is found in the organic phase after a first wash, and 451 ppm after the second wash. This value increases to 1564 ppm after the first wash and 7048 ppm after the second wash when the concentration of the solids is 40 weight percent in the organic phase and the concentration of the aqueous base is 10.3-10.7 weight percent as represented by Example 5.

TABLE 2

|  | Ex. 1 | | Ex. 2 | | Ex. 3 | | Ex. 4 | | Ex. 5 | |
|---|---|---|---|---|---|---|---|---|---|---|
|  | \multicolumn{10}{c}{Wash No.} |
|  | 1 | 2 | 1 | 2 | 1 | 2 | 1 | 2 | 1 | 2 |
| Solids in organic phase (wt %) | 15 | | 20 | | 25 | | 30 | | 40 | |
| NaOH concentration in aqueous phase (wt %) | 4.7 | 4.1 | 6.0 | 5.6 | 7.3 | 6.8 | 8.5 | 8.9 | 10.7 | 10.3 |
| NaOH added vs. stoichiometric for MAOH (%) | 75 | 75 | 75 | 75 | 75 | 75 | 75 | 75 | 75 | 75 |
| Water in final organic phase (ppm) | 375 | 451 | 479 | 528 | 629 | 1,101 | 554 | 1,928 | 1,564 | 7,048 |

EXAMPLE 6, COMPARATIVE EXAMPLE 3

These examples illustrate the effect of varying of the ratio of the organic and aqueous NaOH phases. For each extraction, the organic phase was a capping reaction mixture in toluene containing 42 weight percent solids. For Comparative Example 3, the aqueous NaOH phase contained 3 weight percent NaOH. For Example 6, the aqueous NaOH phase contained 9 weight percent NaOH. In Comparative Example 3, 2.5 weight parts of the organic phase are extracted with one weight part of the aqueous NaOH, whereas in Example 6, 9 parts of the organic mixture are extracted with one part of the aqueous NaOH. The extraction procedure of Examples 1-5 was used. The results are provided in Table 3.

It can be seen from Table 3 that increasing the amount of the organic fraction being extracted from 2.5 parts to 9 parts of organic mixture for one part of aqueous NaOH adversely affects the residual amounts of methacrylic anhydride, methacrylic acid, and water. It can be noted that the residual MAOH and MAA amounts in Example 8 after Wash 1 and Wash 2 are substantially greater than those amounts in Example 7. In addition, the amount of water retention in the organic phase is substantially greater in Example 8 than in Example 7.

TABLE 3

|  |  | C. Ex. 3 2.5 parts organic: 1 part aqueous-NaOH | | Ex. 6 9 parts organic: 1 part aqueous-NaOH | |
|---|---|---|---|---|---|
|  | Initial organic phase | Organic phase after Wash 1 | Organic phase after Wash 2 | Organic phase after Wash 1 | Organic phase after Wash 2 |
| MAOH (ppm) | 26,984 | 623 | 677 | 1,906 | 1,741 |
| MAA (ppm) | 4,502 | 1,256 | 1,266 | 1,737 | 1,689 |

TABLE 3-continued

|  | | C. Ex. 3<br>2.5 parts<br>organic: 1 part<br>aqueous-NaOH | | Ex. 6<br>9 parts organic: 1 part<br>aqueous-NaOH | |
|---|---|---|---|---|---|
|  | Initial<br>organic<br>phase | Organic<br>phase after<br>Wash 1 | Organic<br>phase after<br>Wash 2 | Organic<br>phase after<br>Wash 1 | Organic<br>phase after<br>Wash 2 |
| DMAP (ppm) | 4,464 | 1,818 | 1,851 | 1,712 | 1,845 |
| Water (ppm) | 1119 | 11,055 | 30,672 | 6,626 | 57,003 |

EXAMPLES 7-10

These examples illustrate the effects of aqueous phase composition (water versus aqueous NaOH) and organic phase solids concentration on residual water and capping reagents and byproducts, as well as the quality of phase separation. The extraction procedure of Examples 1-5 was used. The quality of the separation of the organic phase and aqueous phase was determined visually and is reported as "Decanted well", or "Organic phase emulsified" when an emulsion is formed. The concentration of MAOH+MAA, and that of DMAP were determined on a dry polymer basis (indicated by *). The results are listed in Table 4 below.

It can be seen from Table 4 that extraction with water removes essentially all the DMAP, the retention of water in the organic phase is relatively low, and the separated phases are easily decanted. However, the concentration of the residual MAA+MAOH is relatively high. On the other hand, extracting with aqueous sodium hydroxide is more effective in removing MAA and MAOH, but the residual concentration of DMAP is relatively higher, and so is the retention of water in the organic phase. In addition, organic phase forms an emulsion with the aqueous phase. It can also be seen from Examples 8 and 10 that increasing the concentration of solids in the organic phase from 15 to 30 weight percent adversely affects the extraction process as indicated by the increase in residual MAOH and MAA, and the increase in water retention.

TABLE 4

|  | Ex. 7 | Ex. 8 | Ex. 9 | Ex. 10 |
|---|---|---|---|---|
| Solids in organic phase (wt %) | 15 | 15 | 30 | 30 |
| Wash No. | 1 | 1 | 1 | 1 |
| NaOH added vs. stoich. for MAOH (%) | 0 | 100 | 0 | 100 |
| MAOH + MAA (ppm)* | 268,313 | 8,313 | 263,570 | 10,760 |
| DMAP (ppm)* | 0 | 2,167 | 0 | 2,027 |
| Water in final organic phase (ppm) | 1,225 | 4,564 | 1,629 | 17,121 |
| Quality of separation | Decanted well | Organic phase emulsified | Decanted well | Organic phase emulsified |

EXAMPLES 11-14, COMPARATIVE EXAMPLE 4

These examples illustrate the results of extractions performed on a toluene mixture comprising 25 weight percent poly(arylene ether), 28,032 ppm MAOH+MAA, 2,259 ppm DMAP, and 5 ppm $Na^+$. The oxidative coupling catalyst was removed by chelation prior to extraction. Comparative Example 4 represents a sample that was precipitated using isopropanol as an antisolvent; it was not subjected to extraction prior to precipitation. Table 5 shows the extraction sequence for each example and residual concentrations of MAOH+MAA, DMAP, and $Na^+$ in the organic phase after extraction, on a dry polymer basis. "Stoichiometric" refers to the stoichiometry between the NaOH and the total equivalents of methacrylic acid, wherein the total equivalents of methacrylic acid are the sum of the moles of methacrylic acid produced as a byproduct in the capping reaction and two times the moles of excess methacrylic anhydride used in the capping reaction. In Table 5, "Acetic acid" refers to an aqueous solution consisting of 0.2 moles per liter of acetic acid, and water. In Table 5, "Water" refers to deionized water. For each washing step, one weight unit of aqueous phase was used for seven units of capping reaction mixture. The washing steps were conducted according to the procedure of Examples 1-5.

The results show that the sequence used in Example 11 most efficiently extracts MAOH+MAA, however, a substantial amount of DMAP and sodium ion remains in the organic phase. Examples 12 and 14 both produce efficient extraction of DMAP and sodium, with Example 12 being more efficient at extracting MAOH+MAA.

TABLE 5

|  | Step No. | Aqueous Phase | MAOH +<br>MAA<br>(ppm)* | DMAP<br>(ppm)* | $Na^+$ (ppm)* |
|---|---|---|---|---|---|
| Ex. 11 | 1 | 75% stoich. NaOH | 14,951 | 1,517 | — |
|  | 2 | 75% stoich. NaOH | 2,442 | 1,170 | 1,600 |
|  | 3 | Water | 1,552 | 780 | 544 |
| Ex. 12 | 1 | 75% stoich. NaOH | 8,764 | 2,013 | — |
|  | 2 | 75% stoich. NaOH | 2,837 | 1,823 | — |
|  | 3 | Acetic acid | 2,784 | 0 | 339 |
|  | 4 | Water | 2,330 | 0 | 64 |
| Ex. 13 | 1 | 150% stoich. NaOH | 4,042 | 2,653 | — |
|  | 2 | Acetic acid | 5,639 | 1,313 | 1940 |
|  | 3 | Water | 3,144 | 78 | 518 |
| Ex. 14 | 1 | Water | 101,121 | 590 | — |
|  | 2 | 150% stoich. NaOH | 3,592 | 700 | — |
|  | 3 | Acetic acid | 5,159 | 0 | 915 |
|  | 4 | Water | 3,172 | 0 | 45 |
| C. Ex. 4 | NA | NA | 3,666 | 1,241 | 27 |

*based on dry polymer weight

EXAMPLES 15-18

These examples illustrate the results of extractions performed on a toluene mixture comprising 25 weight percent poly(arylene ether), 27,989 ppm MAOH+MAA, 2,554 ppm DMAP, and 4 ppm $Na^+$. The oxidative coupling catalyst was not removed prior to extraction, and the chelation step was combined with one of the aqueous extraction steps. The washing steps were conducted according to the procedure of Examples 1-5. Table 6 summarizes the extraction sequence for each example and the residual (methacrylic acid+methacrylic anhydride (MAOH+MAA), 4-(N,N-dimethylamino) pyridine (DMAP), and $Na^+$ in the organic phase after extraction, In Table 6, "NTA" refers to the chelant nitrilotriacetic acid, which, when present, was used in an amount of 1.2 moles per mole of copper ion in the polymerization catalyst.

It can be seen from the results in Table 6 that a similar trend as the one for Examples 11-14 is observed, implying that the presence of the oxidative polymerization catalyst does not have a large effect on the extraction process. Thus, removal of the oxidative coupling catalyst and byproducts prior to functionalization of the PPE or prior to extraction can be advantageously avoided.

TABLE 6

| | Step No. | Aqueous Phase | MAOH + MAA (ppm)* | DMAP (ppm)* | Na (ppm)* |
|---|---|---|---|---|---|
| Ex. 15 | 1 | 75% stoich. NaOH + NTA | 31,477 | 1,639 | — |
| | 2 | 75% stoich. NaOH | 2,610 | 1,891 | 1,320 |
| | 3 | Water | 1,612 | 1,620 | 519 |
| Ex. 16 | 1 | 75% stoich. NaOH + NTA | 38,751 | 1,041 | — |
| | 2 | 75% stoich. NaOH | 1,830 | 1,120 | — |
| | 3 | Acetic acid | 2,049 | 115 | 339 |
| | 4 | Water | 1,946 | 0 | 189 |
| Ex. 17 | 1 | 150% stoich. NaOH + NTA | 3,656 | 2,482 | — |
| | 2 | Acetic acid | 3,957 | 901 | 1,050 |
| | 3 | Water | 2,823 | 441 | 663 |
| Ex. 18 | 1 | Water + NTA | 105,543 | 790 | — |
| | 2 | 150% stoich. NaOH | 3,073 | 1,065 | — |
| | 3 | Acetic acid | 3,511 | 193 | 1,080 |
| | 4 | Water | 2,574 | 0 | 391 |

*based on dry polymer weight

EXAMPLES 19 AND 20, COMPARATIVE EXAMPLES 5 AND 6

These examples illustrate the effects of the liquid-liquid extraction on the unsaturated capping groups, specifically the extent to which extraction with aqueous sodium hydroxide hydrolyzes methacrylate capping groups on a poly(arylene ether). All examples started with a toluene solution of a bifunctional PPE having an intrinsic viscosity of 0.09 dL/g that had been capped using methacrylic anhydride, wherein the oxidative coupling catalyst and catalysis byproducts had been removed prior to capping. The toluene solution contained 25 weight percent poly(arylene ether). For Comparative Example 5 and Example 19, the oxidative coupling catalyst and catalysis byproducts had been removed by chelation prior to capping. For Comparative Example 6 and Example 20, no chelation was conducted. For Comparative Examples 5 and 6, no washing was conducted. For Examples 19 and 20, the washing steps were conducted according to the procedure of Examples 1-5. Specifically, Example 19 was washed sequentially with 75% stoichiometric NaOH, 75% stoichiometric NaOH (again), and water. Example 20 was washed sequentially with 75% stoichiometric NaOH and nitrilotriacetic acid, 75% stoichiometric NaOH, and water.

For all examples, the poly(arylene ether) was isolated by evaporation of volatiles in a vacuum oven. The weight percent methacryloyl capping group (—C(=O)CH(CH$_3$)=CH$_2$), based on the total weight of the poly(arylene ether), was determined using $^1$H NMR. The results, presented in Table 7, show, surprisingly, that the extraction with the concentrated sodium hydroxide solution does not adversely affect the methacrylate capping groups. (The apparent increase in capping group concentration for Example 19 versus Comparative Example 5, and for Example 20 versus Comparative Example 6, is not statistically significant.)

TABLE 7

| | MA-Cap (wt %) |
|---|---|
| C. Ex. 5 | 7.68 |
| Ex. 19 | 8.19 |
| C. Ex. 6 | 7.05 |
| Ex. 20 | 7.24 |

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The invention claimed is:

1. A method of preparing a capped poly(arylene ether), comprising:
    reacting a poly(arylene ether) with a capping agent in the presence of a solvent and a capping catalyst to form a capping reaction mixture comprising a capped poly (arylene ether), solvent, capping agent, capping catalyst, and a capping byproduct;
    washing the capping reaction mixture with a basic aqueous solution comprising 10 to 15 weight percent of a base to yield a purified solution comprising capped poly (arylene ether) and solvent; wherein the washing the capping reaction mixture with a basic aqueous solution is conducted at a temperature of 60 to 95° C.; and wherein the capping reaction mixture and the basic aqueous solution are used in a weight ratio of 2:1 to 25:1; and
    isolating the capped poly(arylene ether) by a total isolation method.

2. The method of claim 1, wherein the molar ratio of capping agent to hydroxy groups on the poly(arylene ether) is 1 to 3.

3. The method of claim 1, wherein the capping reaction mixture comprises 5 to 25 weight percent capped poly (arylene ether) during the washing with the basic aqueous solution.

4. The method of claim 1, further comprising adjusting the concentration of the capped poly(arylene ether) in the capping reaction mixture to 5 to 25 weight percent prior to the washing with the basic aqueous solution.

5. The method of claim 1, wherein the base is selected from the group consisting of alkali metal hydroxides, water soluble primary organic amines, water soluble secondary organic amines, water soluble tertiary organic amines, and combinations thereof.

6. The method of claim 1, wherein the base is an alkali metal hydroxide.

7. The method of claim 1, wherein the washing the capping reaction mixture with a basic aqueous solution is conducted at a temperature at which the basic aqueous solution has a first viscosity and the capping reaction mixture has a second viscosity; and wherein a ratio of the first viscosity to the second viscosity is 0.5:1 to 3:1.

8. The method of claim 1, wherein the capping agent is an acid anhydride; and wherein the basic aqueous solution comprises the base in an amount of 0.5 to 2 moles per mole of equivalent free acid, wherein equivalent free acid is the sum of the moles of acid produced as a by-product of the capping reaction and two times the moles of excess capping agent.

9. The method of claim 8, wherein the basic aqueous solution comprises the base in an amount of 0.6 to 1.5 moles per mole of equivalent free acid.

10. The method of claim 1, wherein the basic aqueous solution further comprises a chelant.

11. The method of claim 1,
further comprising oxidatively polymerizing a monohydric phenol in the presence of a solvent and a catalyst metal to form a polymerization reaction mixture comprising the poly(arylene ether), solvent, and an oxidative polymerization catalyst metal; and
further comprising chelating the oxidative polymerization catalyst metal prior to the washing the capping reaction mixture with a basic aqueous solution.

12. The method of claim 1,
further comprising oxidatively polymerizing a monohydric phenol in the presence of a solvent and a catalyst metal to form a polymerization reaction mixture comprising the poly(arylene ether), solvent, and an oxidative polymerization catalyst metal; and
further comprising chelating the capping catalyst after the washing the capping reaction mixture with a basic aqueous solution.

13. The method of claim 1, wherein the method is conducted in batch mode; wherein the method further comprises washing the capping reaction mixture with water, an acidic aqueous solution, or a second basic aqueous solution; and wherein the washing the capping reaction mixture with water, an acidic aqueous solution, or a second basic aqueous solution is conducted in the same equipment as the washing the capping reaction mixture with the basic aqueous solution.

14. The method of claim 1, wherein the method is conducted in continuous mode; wherein the method further comprises washing the capping reaction mixture with water, an acidic aqueous solution, or a second basic aqueous solution; and wherein the washing the capping reaction mixture with water, an acidic aqueous solution, or a second basic aqueous solution is conducted in different equipment than is used for the washing the capping reaction mixture with the basic aqueous solution.

15. The method of claim 1, wherein the total isolation method is selected from the group consisting of devolatilizing extrusion, spray drying, wiped film evaporation, flake evaporation, flash devolatilization, and combinations of the foregoing methods.

16. The method of claim 1, wherein the total isolation method comprises devolatilizing extrusion.

17. The method of claim 1, further comprising washing the capping reaction mixture with water.

18. The method of claim 1, further comprising washing the capping reaction mixture with an acidic aqueous solution.

19. The method of claim 18, wherein the acidic aqueous solution comprises 0.2 to 1 moles per liter of an acid.

20. The method of claim 18, wherein the acid is selected from the group consisting of hydrochloric acid, sulfuric acid, formic acid, acetic acid, propionic acid, oxalic acid, citric acid, and mixtures thereof.

21. The method of claim 18, wherein the acid is acetic acid.

22. The method of claim 1, wherein the capping reaction mixture is extracted with
a first aqueous solution comprising an alkali metal hydroxide,
a second aqueous solution comprising an alkali metal hydroxide,
water.

23. The method of claim 1, wherein the capping reaction mixture is extracted with
an aqueous solution comprising an alkali metal hydroxide,
an aqueous solution comprising acetic acid, and
water.

24. The method of claim 1, wherein the capping reaction mixture is extracted with
a first aqueous solution comprising an alkali metal hydroxide,
a second aqueous solution comprising an alkali metal hydroxide,
an aqueous solution comprising acetic acid, and
water.

25. The method of claim 1, wherein the capping reaction mixture is extracted with
a first water wash,
an aqueous solution comprising an alkali metal hydroxide,
an aqueous solution comprising acetic acid, and
a second water wash.

26. The method of claim 1, wherein the capping reaction mixture is extracted with
a first aqueous solution comprising an alkali metal hydroxide,
a second aqueous solution comprising an alkali metal hydroxide,
a first water wash, and
a second water wash.

27. The method of claim 1, further comprising washing the purified solution with an aqueous solution selected from the group consisting of basic aqueous solutions, acidic aqueous solutions, and water.

28. The method of claim 1, wherein the solvent is selected from the group consisting of toluene, xylenes, styrene, vinyl $C_1$-$C_6$ alkylbenzenes, divinylbenzene, allylbenzene, 1-ethynylbenzene, and mixtures thereof 29. A method of preparing a capped poly(arylene ether), comprising:
reacting a poly(arylene ether) with a capping agent in the presence of a solvent and a capping catalyst to form a capping reaction mixture comprising a capped poly(arylene ether), solvent, capping agent, capping catalyst, and a capping byproduct; wherein the poly(arylene ether) is the product of oxidatively polymerizing monomers comprising 2,6-xylenol and 2,2-bis(3,5-dimethyl-4-hydroxyphenyl)propane; wherein the capping agent is (meth)acrylic anhydride; wherein the molar ratio of (meth)acrylic anhydride to hydroxy groups on the poly(arylene ether) is 1 to 3; wherein the solvent is toluene; wherein the capping catalyst is 4-(N,N-dimethylamino) pyridine; and wherein the capping byproduct is (meth) acrylic acid;
adjusting the concentration of the capped poly(arylene ether) in the capping reaction mixture to 5 to 25 weight percent prior to the washing with the basic aqueous solution;

washing the capping reaction mixture with a basic aqueous solution comprising 10 to 15 weight percent of sodium hydroxide to yield a first purified solution comprising capped poly(arylene ether) and solvent; wherein washing the capping reaction mixture with a basic aqueous solution is conducted at a temperature of 60 to 95° C.; and wherein the capping reaction mixture and the basic aqueous solution are used in a weight ratio of 2:1 to 25:1;

washing the first purified solution with an acidic aqueous solution comprising 0.2 to 1 mole per liter acetic acid to yield a second purified solution comprising capped poly(arylene ether) and solvent; wherein washing the first purified solution with an acidic aqueous solution is conducted at a temperature of 60 to 95° C.;

washing the second purified solution with water to yield a third purified solution comprising capped poly(arylene ether) and solvent; wherein washing the second purified solution with water is conducted at a temperature of 60 to 95° C.; and isolating the capped poly(arylene ether) by devolatilizing extrusion.

30. A (meth)acrylate-capped poly(arylene ether) prepared by the method of claim 29 and comprising less than or equal to 2,500 parts per million by weight of (meth)acryloyl groups, wherein the (meth)acryloyl groups are the total (meth)acryloyl groups present as (meth)acrylic acid or (meth)acryloyl anhydride; and less than or equal to 1,000 parts per million by weight of 4-(N,N-dimethylamino)pyridine.

31. The method of claim 29, wherein the capping reaction mixture consists of the capped poly(arylene ether), solvent, capping agent, capping catalyst, and capping byproduct; and wherein the basic aqueous solution consists of water and the 10 to 15 weight percent of sodium hydroxide.

* * * * *